United States Patent [19]

Kobayashi

[11] Patent Number: 5,707,129
[45] Date of Patent: Jan. 13, 1998

[54] VEHICULAR HEADLAMP PRODUCING LOW BEAM HAVING CUT LINE CONTROLLED IN ACCORDANCE WITH CONDITION OF CURVED ROAD

[75] Inventor: Shoji Kobayashi, Shizuoka, Japan

[73] Assignee: Koito Manufacturing Co., Ltd., Tokyo, Japan

[21] Appl. No.: 322,146

[22] Filed: Oct. 13, 1994

[30] Foreign Application Priority Data

Oct. 13, 1993 [JP] Japan .................. 5-255672

[51] Int. Cl.$^6$ .................................................. B60Q 1/08
[52] U.S. Cl. .................. 362/66; 362/37; 362/283; 362/802
[58] Field of Search ................. 362/61, 66, 37, 362/283, 284, 70, 319, 802, 351, 276, 40

[56] References Cited

U.S. PATENT DOCUMENTS

| | | | |
|---|---|---|---|
| 4,663,692 | 5/1987 | Carothers et al. | 361/117 |
| 4,733,333 | 3/1988 | Shibata et al. | 362/40 |
| 4,831,506 | 5/1989 | Miyazawa | 362/284 |
| 4,860,601 | 8/1989 | Shibata et al. | 73/865.8 |
| 4,908,560 | 3/1990 | Shibata et al. | 318/603 |
| 4,943,893 | 7/1990 | Shibata et al. | 362/37 |
| 4,963,794 | 10/1990 | Shibata et al. | 315/81 |
| 4,967,319 | 10/1990 | Seko | 362/61 |
| 4,970,906 | 11/1990 | Shibata et al. | 73/865.8 |
| 5,060,120 | 10/1991 | Kobayashi et al. | 362/61 |
| 5,068,768 | 11/1991 | Kobayashi | 362/61 |
| 5,138,540 | 8/1992 | Kobayashi | 362/268 |
| 5,158,352 | 10/1992 | Ikegami et al. | 362/319 |
| 5,379,196 | 1/1995 | Kobayashi et al. | 362/61 |
| 5,412,543 | 5/1995 | Kobayashi et al. | 362/66 |
| 5,426,294 | 6/1995 | Kobayashi et al. | 250/226 |
| 5,436,807 | 7/1995 | Kobayashi | 362/66 |

*Primary Examiner*—Ira S. Lazarus
*Assistant Examiner*—Sara Sachie Raab
*Attorney, Agent, or Firm*—Sughrue, Mion, Zinn, Macpeak & Seas, PLLC

[57] ABSTRACT

A headlamp for vehicular use including a rotatable shade composed of a right shade and a left shade and which constitutes a clear-cut line vertically moving adjusting device for vertically moving and adjusting a clear-cut line of a low beam produced by the headlamp, a curved road detecting device for detecting a condition of a curved road in front of the vehicle, and a main optical axis lateral direction tilting adjusting device. The rotatable shade is rotated by a predetermined amount in accordance with the information of a curved road detected by the steering sensor so that the clear-cut line is vertically moved and adjusted. Further, the reflector (and the bulb mounted thereon) is laterally slid by a predetermined amount so that the light distribution pattern and the "hot zone" are laterally moved and adjusted. Accordingly, the visibility, especially the visibility on the steering side, is improved when the vehicle travels on a curved road at either low or high speed.

42 Claims, 7 Drawing Sheets

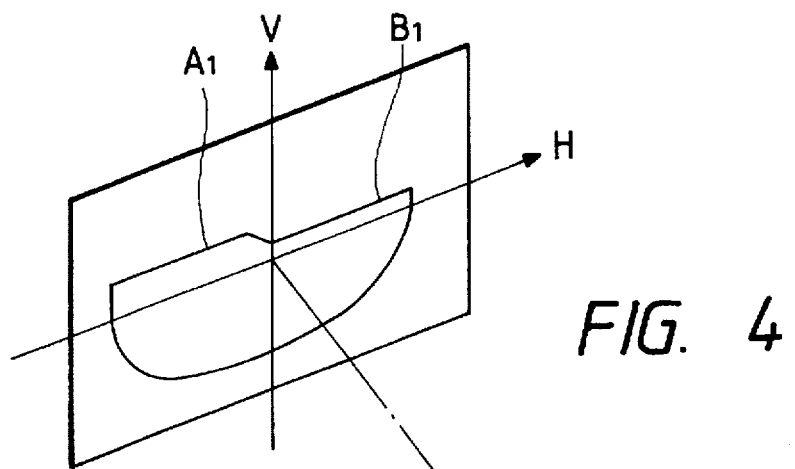
FIG. 4
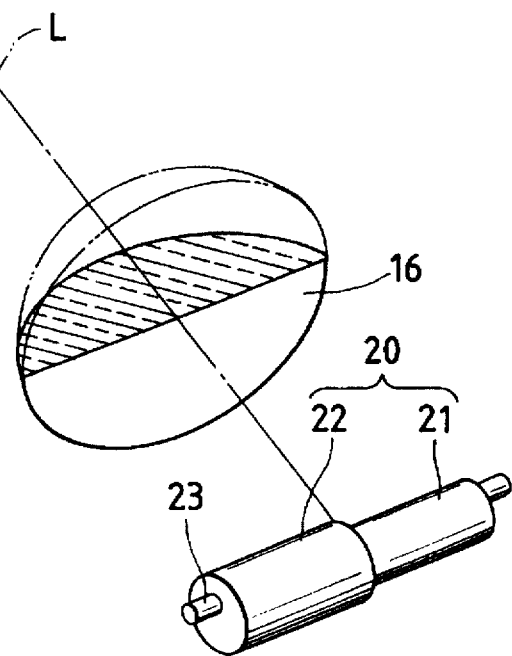
FIG. 5
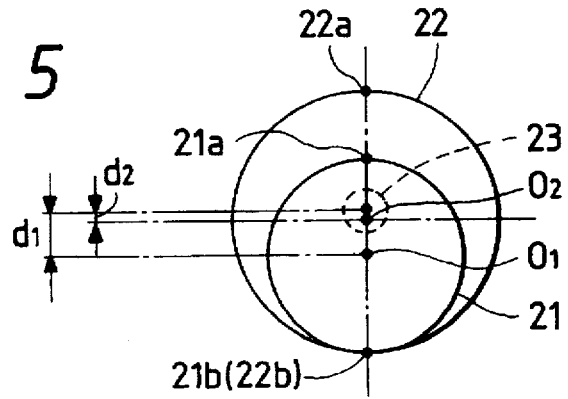

VEHICULAR HEADLAMP PRODUCING LOW BEAM HAVING CUT LINE CONTROLLED IN ACCORDANCE WITH CONDITION OF CURVED ROAD

BACKGROUND OF THE INVENTION

The present invention relates to a vehicular headlamp for forming a low beam, and more particularly relates to a vehicular headlamp having an adjusting system with which a clear-cut line of the low beam can be vertically shifted and adjusted.

A vehicular headlamp forms two types of beams, i.e., a main or high beam and a low beam. The main beam illuminates a distant region in the case where there are no vehicles traveling in either direction in front of the vehicle. On the other hand, the low beam illuminates a short-distance region, determined by cutting out an upper part of the main beam, so that drivers of vehicles in front of the vehicle are not dazzled.

When a vehicle is traveling on a curved road using the low beam, a clear-cut line in the light distribution pattern of the low beam is located below a horizontal plane extending through the optical axis of the headlamp. As a result, the visibility, especially the visibility on the steering side (the side towards which the steering operation has been conducted) is not good.

In order to solve the above problems, Unexamined Japanese Patent Application No. Hei. 1-115751 discloses a beam cut adjustable headlamp which provides good visibility in the front when a vehicle is traveling on a curved road. As illustrated in FIG. 14, such a headlamp includes a fixed reflector 2 and a movable reflector 3 mounted in a lamp housing 1. Being linked with a steering operation (steering wheel operation), the movable reflector 3 rotates in the steering direction so that the beam of light reflected by the movable reflector 3 is directed toward the steering side of the vehicle.

According to the adjustable beam-cut headlamp described above, being linked with the steering operation, the so-called "hot zone" moves in the lateral direction, as shown in FIG. 15, in the direction of $Z_1 \rightarrow Z_2$ and $Z_1 \rightarrow Z_3$. However, the position of the clear-cut line CL, which defines the upper boundary of the light distribution pattern, does not change at all. Therefore, the visibility is not sufficient in the region of the corner on the side to which the vehicle is steered.

SUMMARY OF THE INVENTION

The present invention has been made in view of the foregoing problems accompanying the conventional headlamp. Therefore, it is an object of the present invention to provide a vehicular headlamp having improved visibility provided by a low beam when a vehicle carrying the headlamp is traveling on a curved road.

In order to accomplish the above and other objects of the invention, according to the present invention, a vehicular headlamp is provided which includes a clear-cut line vertical moving adjusting means for vertically shifting and adjusting a clear-cut line of a low beam and a curved road detecting means for detecting a condition of a curved road in front of a vehicle. The clear-cut line vertical moving adjusting means vertically shifts and adjusts the clear-cut line in accordance with information of the curved road detected by the curved road detecting means.

In the vehicular headlamp according to the invention, the headlamp further includes a main optical axis lateral tilting adjusting means for laterally tilting the main optical axis of the low beam. The main optical axis lateral tilting adjusting means laterally tilts and adjusts the main optical axis in accordance with information of the curved road detected by the curved road detecting means.

The curved road detecting means detects the condition of a curved road, i.e., the radius of curvature in the lateral direction. In accordance with the information of the curved road, the clear-cut vertical direction moving adjusting means shifts the clear-cut line in the vertical direction so that the visibility in the front of the vehicle is enhanced, especially the visibility in a corner portion toward which the vehicle is steered.

Further, in accordance with the information about the condition of a curved road detected by the curved road detecting means, the main optical axis lateral direction tilting adjusting means tilts the main optical axis of the headlamp in the lateral direction toward the side to which the vehicle is steered so that the visibility in front, especially the visibility in the corner portion on the side toward which the vehicle is steered, is improved.

BRIEF DESCRIPTION OF THE DRAWINGS

FIG. 4 is a perspective view showing the light distribution pattern formed by a shade and lamp, wherein the view is taken from the driver's side;

FIG. 5 is a view for explaining a profile of the shade taken from the left of FIG. 1;

DESCRIPTION OF THE PREFERRED EMBODIMENTS

Preferred embodiments of the present invention will now be described with reference to the accompanying drawings.

FIGS. 1 to 11 are views showing a vehicular headlamp according to a first embodiment of the present invention. The headlamp shown in the figures as an example is applied to a vehicle used in Japan where one drives on the left side of the road. Of course, the same principles can be applied to vehicles intended to be driven on the right side of the road by interchanging the right and left headlamp assemblies.

Figure 1:
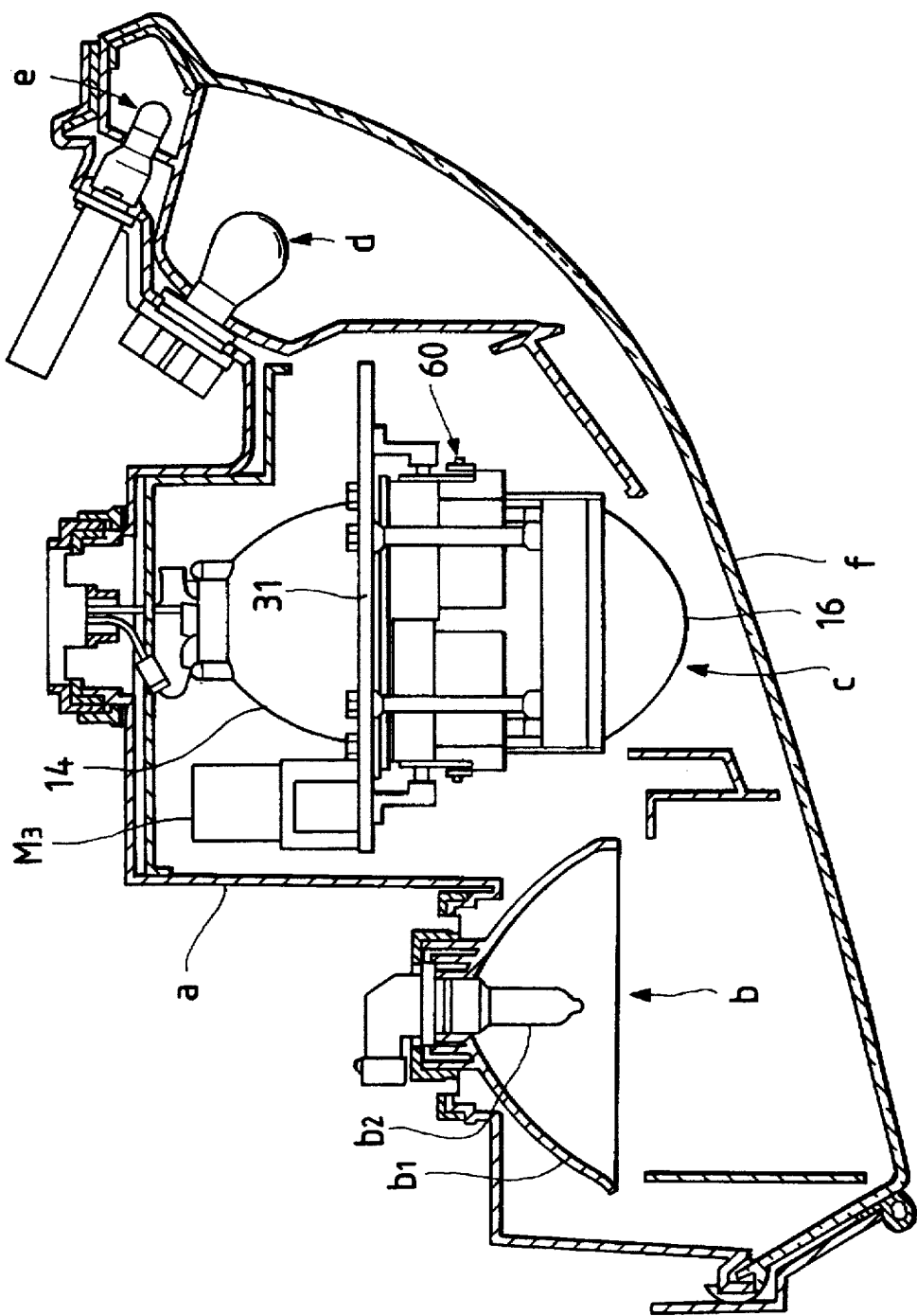
FIG. 1 is a horizontal sectional view of a vehicular headlamp constructed according to a first embodiment of the present invention.
Figure 2:
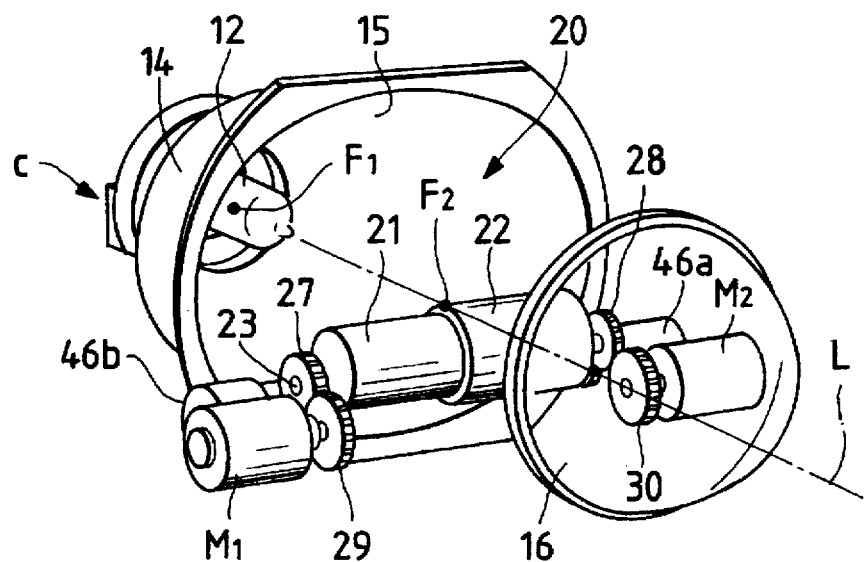
FIG. 2 is a perspective view showing the internal construction of the lamp for forming a low beam provided in the headlamp.
Figure 3:
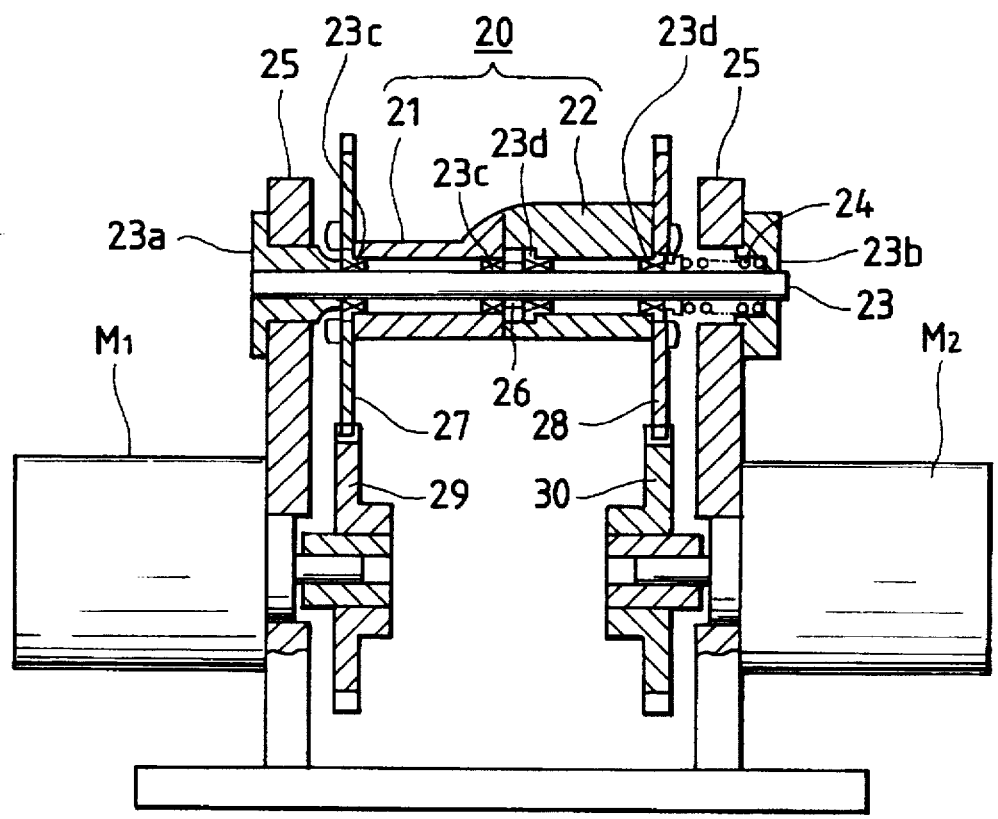
FIG. 3 is a lateral longitudinal sectional view of the shade provided in the lamp.
Figure 6:
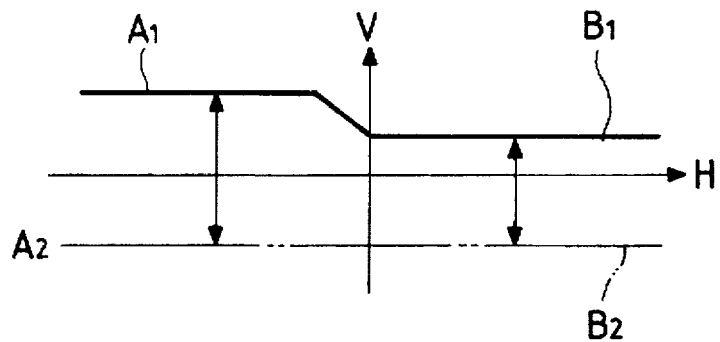
FIG. 6 is a view showing a change in the clear-cut line of the light distribution pattern of the low beam formed by the lamp.
Figure 7:
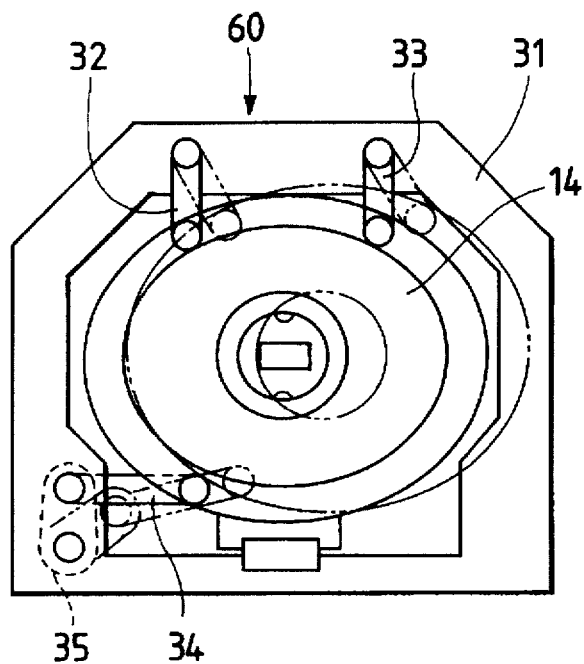
FIG. 7 is a front view of a reflector lateral sliding mechanism.
Figure 8:
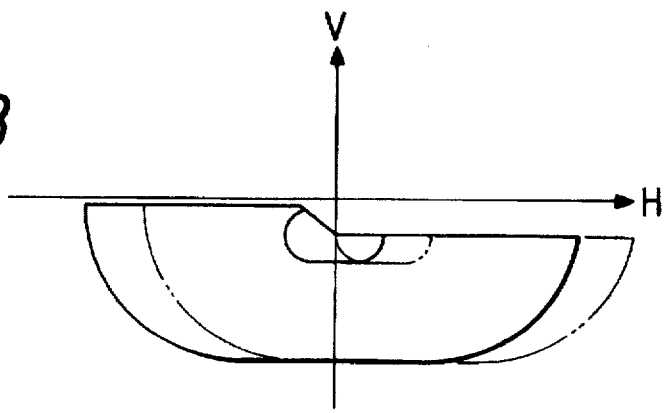
FIG. 8 is a view showing a change in the light distribution pattern in the case where the reflector is slid to the left with respect to the driver.
Figure 9:
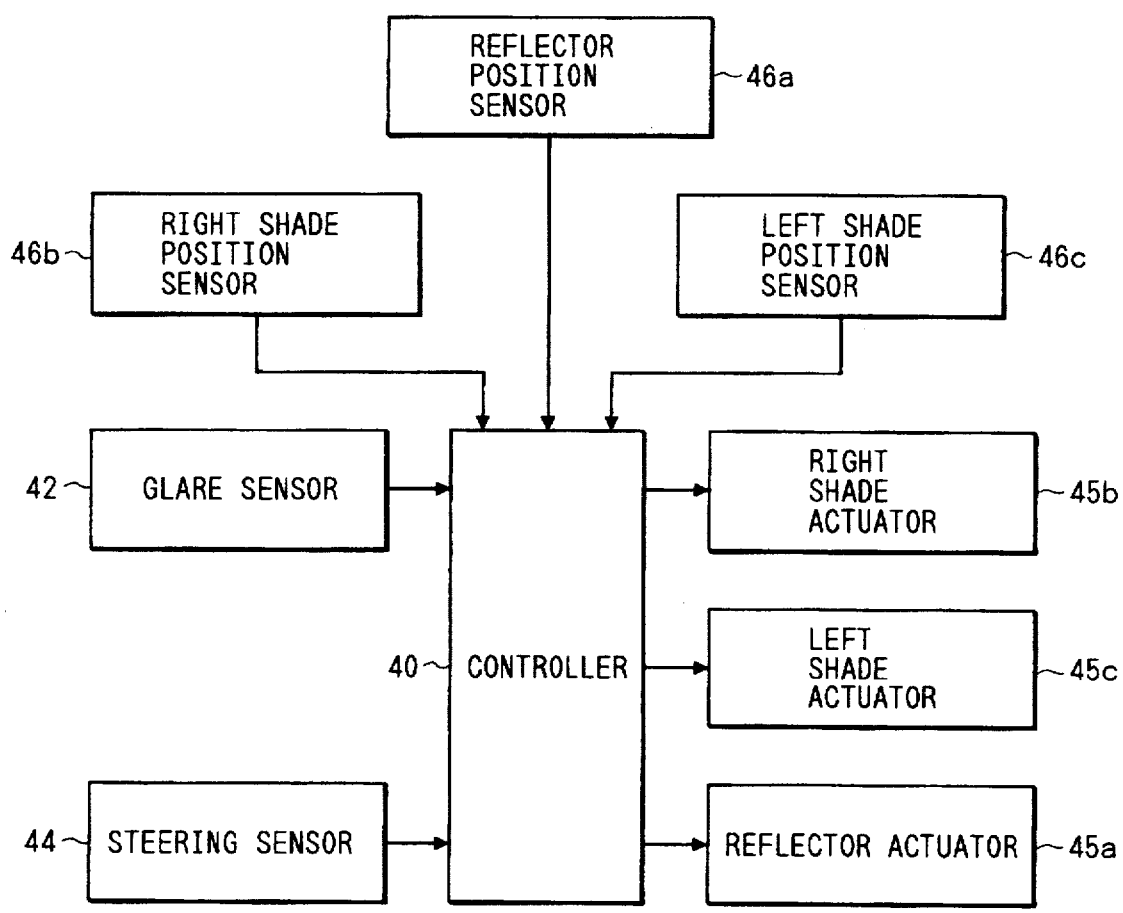
FIG. 9 is a block diagram showing a system for controlling the rotation of the shade for clear-cut line formation and also for controlling the lateral sliding motion of the reflector.
Figure 10:
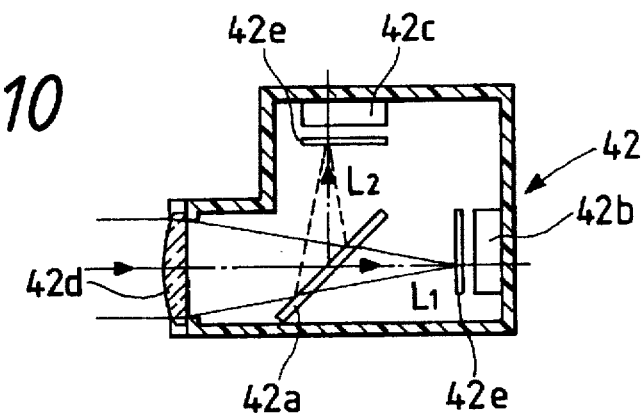
FIG. 10 is a sectional view of the glare sensor, which is a detecting device for detecting the presence of a preceding vehicle and a vehicle traveling in the opposite direction.
Figure 11:
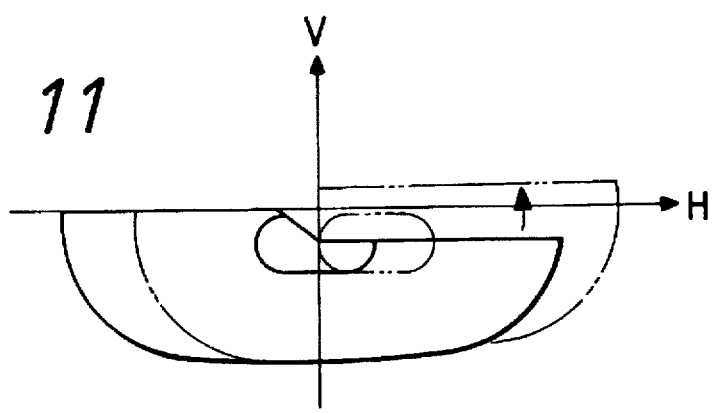
FIG. 11 is a view showing a change in the light distribution pattern in the case where the reflector slides and the shade rotates.

Of these drawings, FIG. 1 is a horizontal sectional view of the headlamp, FIG. 2 is a perspective view showing the inner construction of a lamp for forming a low beam provided in the headlamp, FIG. 3 is a longitudinal sectional view of a shade provided in the lamp, FIG. 4 is a perspective view of the light distribution pattern formed by the shade and lamp, this view being taken from the driver's side, FIG. 5 is a view for explaining a configuration of the shade seen from the left in FIG. 2, FIG. 6 is a view showing a change in the clear-cut line in the light distribution pattern of the low beam formed by the lamp, FIG. 7 is a front view showing the lateral sliding mechanism of the reflector, FIG. 8 is a view showing a change in the light distribution pattern provided when the reflector is slid to the left with respect to the driver, FIG. 9 is a block diagram of the device for controlling the rotation of the shade for forming the clear-cut line and also for controlling the lateral sliding motion of the reflector, FIG. 10 is a sectional view of a glare sensor forming a detecting device for detecting the existence of a preceding vehicle and a vehicle traveling in the opposite direction, FIG. 11 is a view showing a change in the light distribution pattern of the low beam in the case where the reflector is slid and the shade rotated.

In FIGS. 1 and 2, reference character a indicates a cup-shaped lamp body, the front of which is open. In the lamp body a, there are provided a reflection-type headlamp c for forming a main beam, a projection type headlamp b for forming a low beam, a clearance lamp d, and a turn signal lamp e. A transparent outer lens f is fitted over the front opening of the lamp body a. The above parts are integrated into a combination headlamp.

The reflection-type headlamp b is constructed in such a manner that a light bulb $b_2$ is attached to a parabolic reflector $b_1$. A beam of light emitted from the bulb $b_2$ is reflected by the reflector $b_1$ producing a parallel beam of light. By the action of light distribution control steps (not shown in the drawings) formed on the outer lens f, the light beam is diffused to the front, so that the desired light distribution pattern for the main beam is formed.

The projection type headlamp c includes is provided with an approximately elliptic reflector 14 in which a light bulb 12 is mounted. A projection lens 16 is disposed in front of the reflector 14. A shade 20 for shading a portion of the light reflected by the reflector 14 and advancing to the projection lens 16 is provided to form the clear-cut line of the low beam. An elliptic reflecting surface 15 subjected to aluminum vapor-deposited processing is formed inside the reflector 14. As is well known, this elliptic reflecting surface 15 has a first focus $F_1$ and a second focus $F_2$. The filament of the bulb 12 is disposed at the position of the first focus $F_1$. The shade 20 is provided at the position of the focus of the projection lens 16, which is adjacent the second focus $F_2$. Light emitted by the bulb 12 is reflected by the elliptic reflection surface 15 and directed toward the front. The light beam is made to be approximately parallel by the action of the projection lens 16, as a result of which the low beam shown by a solid line in FIG. 8 is formed.

As shown in FIGS. 2, 3 and 4, the shade 20 is composed of a right shade 21 (when viewed from the reflector 14 side, the shade 21 is disposed on the right), and a left shade 22 (when viewed from the reflector 14 side, the shade 22 is disposed on the left). Thus, the shade 20 is laterally divided into right and left shades at a position approximately directly below the optical axis. The shades 21, 22 are formed with cylindrical members having different diameters. The left and right shades are independently and rotatably supported by a horizontal support shaft 23. Both ends of the horizontal support shaft 23 are supported by bearings 23a, 23b fixed to the frame 25, and ball bearings 23c, 23d respectively support the shades 21, 22. A compression coil spring 24 urges the left shade 22 against the right shade 21. A spacer washer 26 is assembled to the support shaft 23 and interposed between the bearings 23c and 23d. Due to the presence of the spacer washer 26, a small gap is formed between the shades 21 and 22 so that the rotational motions of the two shades 21, 22 are not obstructed.

The shades 21, 22 are provided with gears 27, 28 engaging with drive gears 29, 30 mounted on output shafts of motors $M_1$ and $M_2$, respectively. The shades 21, 22 are independently driven to rotate by the motors $M_1$ and $M_2$, respectively.

When the shades 21, 22 are rotated, in the ranges from $A_1$ to $A_2$ and from $B_1$ to $B_2$ shown in FIG. 6, the height and profile of clear-cut lines respectively formed by the shades 21, 22 can be arbitrarily adjusted on the right and left of the vertical axis V on the light distribution screen.

The horizontal support shaft 23, which is a rotational center of the shades 21, 22, is eccentric with respect to the axial centers $O_1$ and $O_2$ shown in FIG. 5 of the shades 21, 22, which are cylindrical rotating bodies. In other words, the shades 21, 22 are eccentric with respect to the support shaft 23. Therefore, when the shades 21, 22 are rotated, the clear-cut lines are raised or lowered in the ranges from $A_1$ to $A_2$ and from $B_1$ to $B_2$ shown in FIG. 6. In this connection, reference characters $d_1$, $d_2$ shown in FIG. 5 express amounts of eccentricity of the shades 21, 22 with respect to the rotational center.

That is, in the first embodiment the shade 20 forms the left-side light distribution required for Japan and other countries where one drives on the left side of the road. The clear-cut line effected by the right shade 21 is formed at a position indicated by $A_1$ in FIG. 5, in which the position indicated by 21a is the uppermost position. In other words, in this case, the height of the shade 21 is the lower of the two. When the shade 21 is rotated from this position, the clear-cut line is gradually lowered, and the clear-cut line effected by the right shade 21 is formed at a position indicated by $A_2$, in which case the position indicated by 21b is the uppermost position as shown in FIG. 5. That is, the height of the shade 21 in this case is the higher. The clear-cut line effected by the left shade 22 is formed at a position indicated by $B_1$ because the position indicated by 22a is the uppermost position. That is, the height of the shade 22 in this case is the lower of the two. The clear-cut line effected by the right shade 22 is formed at a position indicated by $B_2$ in the embodiment shown in FIG. 5, in which the position indicated by 22b is the uppermost position because the height of the shade 22 in this case is the higher.

The reflector lateral sliding mechanism 60 shown in FIGS. 1 and 7 laterally slides the reflector 14 with respect to the projection lens 16 and the shade 20. This reflector laterally sliding mechanism 60 is provided with two links 32, 33 supported by the frame 31 through pins, the two links 32, 33 suspending and supporting the reflector 14, links 34, 35 for laterally oscillating the reflector 14, and a drive motor $M_3$ (shown in FIG. 1) for rotating the link 34. Torque from the motor $M_3$ laterally oscillates the links 35, 34. Due to the foregoing, the reflector 14 oscillates laterally. A solid line in FIG. 7 shows a condition in which the center of the reflector 14 coincides with that of the lens 16, that is, a condition in which the main optical axis of the headlamp b is not inclined. Details of the reflector lateral sliding mechanism 60 are disclosed in Japanese Patent Application No. Hei. 5-194250.

When the reflector 14 and the bulb 12 are slid as illustrated by an imaginary line in FIG. 7 under the above condition, i.e., the reflector 14 and the bulb 12 are slid to the left when viewed from the driver's side, the main optical axis L is inclined to the right with respect to the driver. Therefore, the light distribution pattern and the "hot zone," initially located at the positions shown by the solid lines in FIG. 8, are shifted to the right, as shown by an imaginary line in FIG. 8 when viewed from the driver's side.

FIG. 9 is a block diagram showing the overall system of the apparatus for controlling the low beam light distribution pattern.

A controller 40 controls the rotation of the shade 20 and the slide of the reflector 14 in accordance with the condition of the curved road on which the vehicle is traveling and the presence of a vehicle in front. The controller 40 successively inputs signals supplied from a glare sensor 42 which detects the presence of a preceding vehicle or a vehicle traveling in the opposite direction in front of the vehicle carrying the headlamp. In accordance with the output of the glare sensor 42, the controller 40 detects the presence of a preceding vehicle or a vehicle traveling in the opposite direction. When there is a preceding vehicle or a vehicle traveling in the opposite direction, the controller 40 controls the rotation of the shade 20 so that the emitted beam does not cause glare for the driver of such a vehicle.

As illustrated in FIG. 10, the glare sensor 42 is constituted by a beam splitter 42a which transmits a yellow light beam $L_1$ and reflects a blue light beam $L_2$. CCDs 42b and 42c respectively receive the light beams $L_1$ and $L_2$ split by the beam splitter 42a. The CCDs 42b and 42c output respective electrical signals proportional to the amount of received light to the controller 40. The glare sensor 42 is also provided with an objective lens 42d for converging the incoming beam of light, and infrared ray filters 42e respectively disposed in front of the CCDs 42c and 42d for cutting infrared light from the received light.

The controller 40 discriminates whether or not the output of the glare sensor 42 is less than a predetermined value. That is, when an output of the CCD 42b is not less than the predetermined value, it is determined that a preceding vehicle is present, and when the output of the CCD 42c is not less than a predetermined value, it is determined that a vehicle traveling in the opposite direction is present. In the case where a preceding vehicle is present, the rotation of the right shade 21 forming a clear-cut line on the traveling lane side (a clear cut line on the left with respect to the vertical line V) is effected in such a manner that the clear-cut line on the running lane side is not located at a position above the horizon H. In the case where a vehicle traveling in the opposite direction is present, rotation of the left shade 22 forming a clear-cut line on the opposite lane (a clear-cut line on the right side with respect to the horizon) is effected in such a manner that the clear-cut line on the opposite lane side is not located above the horizon H. In this way, glare light is prevented from being generated.

A steering sensor 44 functions as a curved road detecting device for detecting the steering direction and angle of the steering wheel. The controller 40 inputs curved road information detected by the steering sensor 44. In the controller 40 there is stored in advance a table correlating the sliding position ad of the reflector 14 for forming the most appropriate light distribution pattern with respect to the radius of curvature of a curved road, and also the rotational position $\Delta q$ ($\Delta qR$ and $\Delta qL$) of the shade 20 (the right shade 21 and the left shade 22). In accordance with the curved road information (the steering direction and angle) from the steering sensor 44, the controller 40 computes the direction and radius of curvature of the curved road, and outputs signals to the actuators 45a, 45b, 45c so that the reflector 14 and the right and left shades 21, 22 are appropriately adjusted to optimum positions. The system also includes a reflector position sensor 46a, right shade position sensor 46b and left shade position sensor 46c for detecting the present positions $\Delta d_0$, $\Delta q_0 R$, $\Delta q_0 L$ of the reflector 14, right shade 21 and left shade 22, respectively.

For example, in a case where the lane in which the vehicle is traveling curves to the right, from the curved road information detected by the steering sensor 44, the controller 40 recognizes that the lane curves to the right, and also computes a radius of curvature of the curved road. At the same time, the controller 40 computes a sliding amount $\Delta d_x$ (=$\Delta d - \Delta d_0$) of the reflector 14 and a rotational amount $\Delta qL_x$ (=$\Delta qL - \Delta q_0 L$) of the left shade 22, and outputs such values to the actuators 45a, 45c. Due to the foregoing, the reflector 14 is slid to the left by an amount of $\Delta d_x$, and at the same time the left shade 22 rotated by an amount of $\Delta qL_x$. Therefore, as illustrated in FIG. 11, the light distribution pattern and hot zone are shifted to the right, and a clear-cut line on the right (on the opposite side lane) is raised by a predetermined amount.

Figure 12:
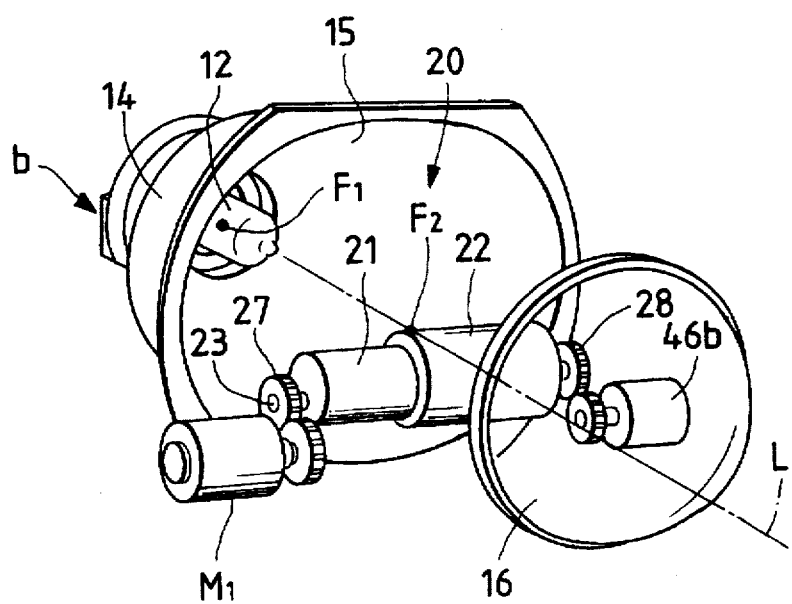
FIG. 12 is a perspective view showing the internal construction of a headlamp for forming a low beam and which is constructed in accordance with a second embodiment of the present invention.

FIG. 12 is a perspective view showing an internal construction of the headlamp for forming a low beam according to the second embodiment of the present invention.

In the first embodiment described above, the shade 20 is divided into the right and left shades 21, 22, and each of the shades 21, 22 is independently controlled to rotate. In the second embodiment, however, the shade 20 is composed of a single cylindrical member, that is, the right shade 21 and the left shade 22 are integrally formed into one body. Therefore, when the motor $M_1$ drives the shade 20 to rotate, the right and left clear-cut lines shown in FIG. 6 integrally shift in the vertical direction.

Since other elements and points are the same as those of the first embodiment described before, like parts are identified by the same reference numerals or characters, and a further explanation thereof is omitted here.

Figure 13:
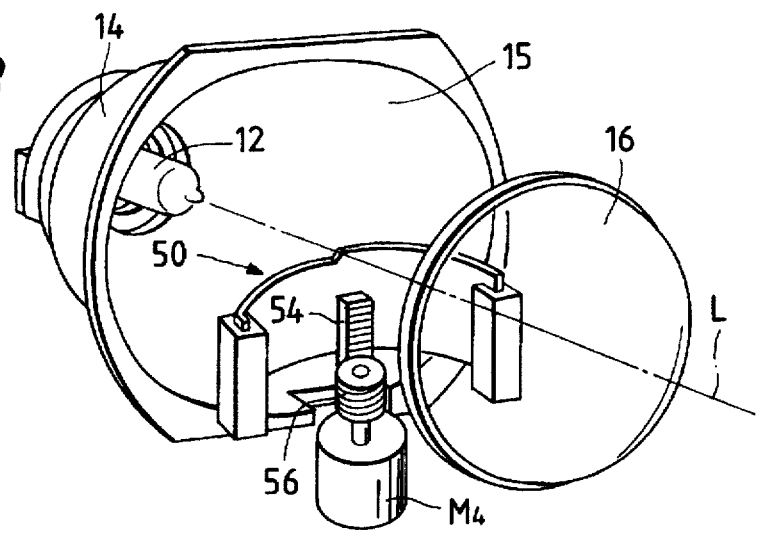
FIG. 13 is a perspective view showing the internal construction of a headlamp for forming a low beam and which is constructed in accordance with a third embodiment of the present invention.
Figure 14:
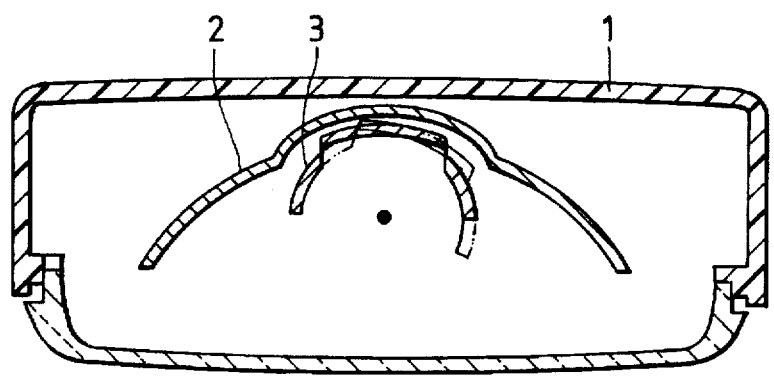
FIG. 14 is a horizontal sectional view of a conventional variable beam-cut headlamp.
Figure 15:
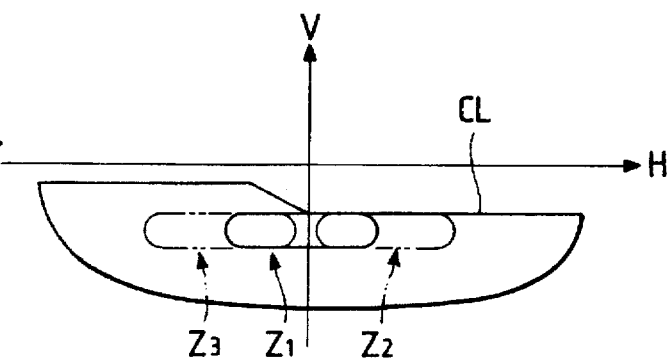
FIG. 15 is a view showing a change in the light distribution pattern of the headlamp.

FIG. 13 is a perspective view showing the internal construction of a headlamp for forming a low beam constructed according to a third embodiment of the present invention.

The clear-cut line of the headlamp for forming a low beam in the first embodiment described above is changed in the vertical direction when the cylindrical shade 20 (21, 22) is rotated on the eccentric rotational support shaft 23. In the third embodiment, however, a vertically provided shade 50 of whose horizontal section is in the form of an arc slides in the vertical direction. The structure of the shade 50 now will be described.

A female screw member 54 extending vertically is fixed to a shade 50 capable of sliding in the vertical direction. A worm 56 attached to an output shaft of the motor $M_4$ is engaged with the female screw member 54. When the motor $M_4$ rotates, the female screw member 54 and the shade 50 are integrally slid in the vertical direction. Accordingly, the clear-cut line of the light distribution pattern vertically changes.

Since other points and elements are the same as those of the first embodiment described before, like parts are identified by the same reference numerals or characters, and a further explanation thereof is omitted here.

In the above embodiment, the steering sensor 44 is used for the curved road detecting device. However, as disclosed in Japanese Unexamined Patent Publication No. 4-260106, a curved road detecting device constructed as explained below may be employed.

An image of the road on which the vehicle is traveling photographed by a television camera disposed at the front of the vehicle is processed by an image processing apparatus, and the processed data is supplied to a computer. By comparing the road information obtained from the image processing apparatus with the road information previously stored in the computer, a profile of the running road is judged.

In the embodiment described above, a link type reflector laterally sliding mechanism 60 is used for laterally tilting the main optical axis of the headlamp. However, it should be noted that the present invention is not limited to a link type mechanism. In general, a headlamp is constructed in such a manner that the main optical axis is tilted and adjusted laterally and vertically by the action of an aiming mechanism. A main optical axis lateral tilting adjusting mechanism (a main optical axis lateral adjusting aiming screw is generally used) of this aiming mechanism may be applied for the main optical axis laterally tilting adjusting mechanism of the present invention.

As can be seen from the above description, according to the projection type vehicular headlamp of the present invention, by raising or lowering a clear-cut line of the low beam in accordance with the condition of a curved road, excellent visibility can be ensured while the vehicle is traveling on a curved road at either low or high speed.

Further, the clear-cut line is vertically adjusted in accordance with the condition of a curved road, and the hot zone is laterally slid for adjustment. Due to the foregoing, excellent visibility can be ensured while the vehicle is traveling on a curved road at either low or high speed.

What is claimed is:

1. A vehicular headlamp for a vehicle having more than two wheels and for producing a low beam, comprising:

curved road detecting means for detecting a condition of a curved road in front of a vehicle; and clear-cut line vertically moving adjusting means for vertically moving and adjusting a clear-cut line of the low beam in accordance with information regarding said condition of said curved road detected by said curved road detecting means.

2. The vehicular headlamp of claim 1, further comprising a main optical axis laterally tilting adjusting means for laterally tilting a main optical axis of said low beam in accordance with said information regarding said condition of said curved road detected by said curved road detecting means.

3. The vehicular headlamp of claim 2, wherein said headlamp comprises a reflector, and said main optical axis laterally tilting adjusting means comprises a mechanism for laterally sliding said reflector with respect to said shade.

4. The vehicular headlamp of claim 3, wherein said main optical axis laterally tilting adjusting means comprises a pair of links supported by a frame through pins, a pair of first links suspending and supporting said reflector, second links for laterally oscillating said reflector, and an actuator for rotating said second link.

5. The vehicle headlamp of claim 1, further comprising a reflector having a first focus and a second focus, the filament of a light bulb being disposed at said first focus and wherein said clear-cut line vertically moving adjusting means comprises a shade disposed within a lamp housing at a position adjacent to said second focus.

6. The vehicular headlamp of claim 5, wherein said shade is rotatably supported by a horizontal support shaft.

7. The vehicular headlamp of claim 6, wherein said horizontal support shaft is eccentric with respect to an axial center of said shade.

8. The vehicular headlamp of claim 6, wherein said shade comprises a first cylindrical member and a second cylindrical member, diameters of said first and second cylindrical members being different from one another.

9. The vehicular headlamp of claim 8, wherein said first cylindrical member and said second cylindrical member are separately supported on said horizontal support shaft.

10. The vehicular headlamp of claim 8, wherein said first cylindrical member and said second cylindrical member are integrally formed.

11. The vehicular headlamp of claim 6, wherein said shade has an edge portion having the shape of an arc, said shade being slidable in a vertical direction.

12. The vehicular headlamp of claim 11, wherein said shade comprises a female screw member extending vertically, an actuator, and a worm attached to an output shaft of said actuator, said worm engaging said female screw member.

13. The vehicular headlamp of claim 1, wherein said curved road detecting means comprises a steering sensor.

14. The vehicular headlamp of claim 1, wherein the headlamp is a projection type headlamp.

15. The vehicular headlamp of claim 1, further comprising means for detecting the presence of a preceding vehicle and a vehicle traveling in an opposite direction, said clear-cut line vertically moving adjusting means being controlled by said vehicle detecting means.

16. The vehicular headlamp of claim 15, wherein said vehicle detecting means comprises a glare sensor.

17. The vehicular headlamp of claim 15, wherein said glare sensor comprises beam splitter means for transmitting a yellow light beam and reflecting a blue light beam, and a pair of CCDs respectively receiving said light beams split by said beam splitter, said CCDs respectively outputting an electrical signal proportional to an amount of received light.

18. The vehicular headlamp of claim 17, wherein said glare sensor further comprises an objective lens for converging a beam of light, and a pair of infrared ray filters disposed in front of respective ones of said CCDs for cutting a beam of external light.

19. A vehicular headlamp for a vehicle having more than two wheels comprising:

a reflector having a front opening, a first focus and second focus;

a light bulb mounted in said reflector at a position of said first focus of said reflector, said reflector forming a low beam from light produced by said light bulb;

an outer lens fixed over said front opening of said reflector;

clear cut line forming means disposed between said reflector and said outer lens at a position adjacent said second focus of said reflector;

means for detecting a condition of a curved road in front of a vehicle; and means for vertically moving said clear cut line forming means in accordance with detection signals provided by said curved road detection means.

20. The vehicular headlamp of claim 19, further comprising means for laterally tilting a main optical axis of the low beam in accordance with said detection signals provided by said curved road detection means.

21. The vehicular headlamp of claim 20, wherein said main optical axis lateral tilting adjusting means comprises a mechanism for laterally sliding said reflector with respect to said shade.

22. The vehicular headlamp of claim 21, wherein said main optical axis lateral tilting adjusting means comprises a pair of links supported by a frame through pins, a pair of first links suspending and supporting the reflector, second links for laterally oscillating the reflector, and an actuator for rotating said second link.

23. The vehicular headlamp of claim 19, wherein said clear cut line forming means comprises shade means.

24. The vehicular headlamp of claim 23, wherein said shade means is rotatably supported by a horizontal support shaft.

25. The vehicular headlamp of claim 24, wherein said shade means comprises a first cylindrical member and a second cylindrical member, diameters of said first and second cylindrical members being different from one another.

26. The vehicular headlamp of claim 25, wherein said first cylindrical member and said second cylindrical member are separately supported on said horizontal support shaft.

27. The vehicular headlamp of claim 25, wherein said first cylindrical member and said second cylindrical member are integrally formed.

28. The vehicular headlamp of claim 23, wherein said horizontal support shaft is eccentric with respect to an axial center of said shade means.

29. The vehicular headlamp of claim 23, wherein said shade means has an edge portion having the form of an arc, said shade means being slidable in a vertical direction.

30. The vehicular headlamp of claim 29, wherein said shade means comprises a female screw member extending vertically, an actuator, and a worm attached to an output shaft of said actuator, said worm engaging with said female screw member.

31. The vehicular headlamp of claim 19, wherein said curved road detecting means comprises a steering sensor.

32. The vehicular headlamp of claim 19, wherein the headlamp is a projection type headlamp.

33. The vehicular headlamp of claim 19, further comprising means for detecting the presence of a preceding vehicle or a vehicle traveling in an opposite direction, said clear-cut line vertically moving adjusting means being controlled by a detection signal provided by said vehicle detecting means.

34. The vehicular headlamp of claim 33, wherein said vehicle detection means comprises a glare sensor.

35. The vehicular headlamp of claim 33, wherein said glare sensor comprises beam splitter means for transmitting a yellow light beam and reflecting a blue light beam, and a pair of CCDs receiving respective ones of said light beams split by said beam splitter, said CCDs respectively outputting an electrical signal proportional to an amount of received light.

36. The vehicular headlamp of claim 35, wherein said glare sensor further comprises an objective lens for converging a beam of light, and a pair of infrared ray filters disposed in front of respective ones of said CCDs for cutting a beam of external light.

37. A system for controlling a clear-cut line of a low beam emitted by a vehicular headlamp having a reflector, comprising:

clear cut line forming means;

means for vertically moving said clear cut line forming means;

curved road detecting means; and means for controlling said clear cut line forming means and said vertically moving means in accordance with a detection signal provided by said curved road detecting means.

38. The clear-cut line controlling system of claim 37, further comprising:

means for detecting the presence of a preceding vehicle or a vehicle traveling in an opposite direction;

means for slidably moving said reflector;

means for detecting a position of said clear cut line forming means; and means for detecting a position of said reflector.

39. The clear-cut line controlling system of claim 38, wherein said vehicle detection means comprises a glare sensor.

40. The clear-cut line controlling system of claim 38, wherein said controlling means controls said clear cut line forming means to move vertically in accordance with a detection signal provided by said curved road detection means and a detection signal provided by said vehicle detection means.

41. The clear-cut line controlling system of claim 37, wherein said clear cut line forming means comprises a shade disposed at a second focus of the reflector.

42. The clear-cut line controlling system of claim 37, wherein said curved road detecting means comprises a steering sensor for detecting a steering direction and angle of a steering wheel.

* * * * *